(12) United States Patent
Simonin et al.

(10) Patent No.: US 9,359,220 B2
(45) Date of Patent: Jun. 7, 2016

(54) TWO-PHASE POSITIVE ELECTRODE MATERIAL FOR A LITHIUM BATTERY AND METHOD FOR THE SYNTHESIS OF SAME

(75) Inventors: Loic Simonin, Grenoble (FR); Carole Bourbon, Saint Michel de Geoirs (FR); Lise Daniel, Saint Marcellin (FR); Sebastien Patoux, Saint Nicolas de Macherin (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 278 days.

(21) Appl. No.: 13/978,556

(22) PCT Filed: Jan. 6, 2012

(86) PCT No.: PCT/FR2012/050045
§ 371 (c)(1),
(2), (4) Date: Sep. 9, 2013

(87) PCT Pub. No.: WO2012/093239
PCT Pub. Date: Jul. 12, 2012

(65) Prior Publication Data
US 2013/0344388 A1    Dec. 26, 2013

(30) Foreign Application Priority Data
Jan. 7, 2011    (FR) ...................................... 11 00057

(51) Int. Cl.
*H01M 4/00* (2006.01)
*H01M 4/13* (2010.01)
(Continued)

(52) U.S. Cl.
CPC ............... *C01D 15/02* (2013.01); *H01M 4/131* (2013.01); *H01M 4/366* (2013.01); *H01M 4/485* (2013.01); *H01M 4/505* (2013.01); *H01M 4/525* (2013.01); *Y02E 60/122* (2013.01)

(58) Field of Classification Search
None
See application file for complete search history.

(56) References Cited

U.S. PATENT DOCUMENTS 6,017,654 A *  1/2000  Kumta et al. ............ 429/231.95
2007/0072081 A1  3/2007  Kitao et al.
(Continued)

FOREIGN PATENT DOCUMENTS

| EP | 1 903 627 A1 | 3/2008 |
|---|---|---|
| WO | WO 91/01572 A1 | 2/1991 |
| WO | WO 2008/039806 A2 | 4/2008 |

OTHER PUBLICATIONS

ManthiramNPL et al., High capacity Li[Li0.2Mn0.54Ni0.13Co0.13]O2-V2O5 composite cathodes with low irreversible capacity loss for lithium ion batteries, Electrochemistry Communications 11 (2009) 84-86, Available online Oct. 29, 2008.*

(Continued)

*Primary Examiner* — Patrick Ryan
*Assistant Examiner* — Jose Colucci Rios
(74) *Attorney, Agent, or Firm* — Oblon, McClelland, Maier & Neustadt, L.L.P

(57) ABSTRACT

A two-phase positive electrode material for a lithium battery in which particles of lithium-enriched layered oxide of formula $Li_{1+x}(Mn_aNi_bM_c)_{1-x}O_2$ are at least partially coated on the surface with a metal oxide of formula $Li_yVO_z$. Such a material is advantageously produced by mixing the lithium-enriched lamellar oxide with at least one precursor of the metal oxide in aqueous solution, followed by thermal treatment at a temperature no lower than 280° C.

20 Claims, 3 Drawing Sheets

(51) Int. Cl.
    *C01D 15/02*    (2006.01)
    *H01M 4/131*   (2010.01)
    *H01M 4/36*    (2006.01)
    *H01M 4/485*   (2010.01)
    *H01M 4/505*   (2010.01)
    *H01M 4/525*   (2010.01)

(56) References Cited

U.S. PATENT DOCUMENTS

2008/0070122 A1    3/2008    Park et al.
2008/0182172 A1    7/2008    Takamuku et al.
2009/0224212 A1*   9/2009    Manthiram et al. ......... 252/503

OTHER PUBLICATIONS

International Search Report issued Mar. 6, 2012 in Application No. PCT/FR2012/050045.

J. Gao, et al., "High capacity Li[Li$_{0.2}$Mn$_{0.54}$Ni$_{0.13}$Co$_{0.13}$]O$_2$-V$_2$O$_5$ composite cathodes with low irreversible capacity loss for lithium ion batteries", Electrochemistry Communications, vol. 11, 2009, pp. 84-86.

* cited by examiner

TWO-PHASE POSITIVE ELECTRODE MATERIAL FOR A LITHIUM BATTERY AND METHOD FOR THE SYNTHESIS OF SAME

TECHNICAL FIELD OF THE INVENTION

The invention relates to a two-phase positive electrode material for a lithium battery and to its process of synthesis.

STATE OF THE ART

Since the advent of novel mobile technologies, the storage of electrical energy has become an essential point of our economy. Renewed attention is being paid to these storage technologies with the development of intermittent renewable energy sources and also of electric and hybrid vehicles. The growth in the market of these technologies involves the development of more reliable and less expensive storage systems with higher energy densities and longer lifetimes.

Today, lithium batteries are one of the best candidates for high energy density and high power applications. Indeed, it is possible to obtain densities of 200 Wh·kg$^{-1}$, whereas nickel/metal hydride or lead/acid batteries respectively offer energy densities of the order of 100 Wh·kg$^{-1}$ and 40 Wh·kg$^{-1}$.

Nevertheless, the high energy demand of novel portable electronic systems and also of future electric vehicles makes it necessary to find novel battery technologies which can exceed 200 Wh·kg$^{-1}$ and achieve still greater energy densities. In point of fact, this involves the development of novel electrode materials, in particular for the positive electrode, which remains the limiting factor.

For this, one of the possible directions is to find positive electrode materials which have a specific capacity which can exceed 200 mAh·g$^{-1}$. However, in general, the lithium batteries comprising materials of high specific capacity as positive electrode material have, in return, in first discharge, a high irreversible capacity. This high irreversible capacity is due to a loss of oxygen, which prevents a portion of the lithium from being reinserted into the structure. This causes major problems of balancing during the production of Li-ion batteries faced with negative electrodes themselves exhibiting irreversible capacities.

By way of example, patent application WO-A-2008/039806 provides a series of layered oxides of (1−x) Li[Li$_{1/3}$Mn$_{2/3}$]O$_2$·xLi[Mn$_{0.5-y}$Ni$_{0.5-y}$Co$_{2y}$]O$_2$ type having a crystal structure of O3 type (space group R3m), with x between 0 and 1 and y between 0 and 0.5, as positive electrode material of high specific capacity. In order to suppress the irreversible reactions between the surface of the positive electrode and the electrolyte during the first discharge, patent application WO-A-2008/039806 proposes to modify the surface of said layered oxides with oxides, such as Al$_2$O$_3$, ZrO$_2$, CeO$_2$, SiO$_2$, ZnO, TiO$_2$ and SnO$_2$. In particular, Li[Li$_{0.20}$Mn$_{0.54}$Ni$_{0.13}$CO$_{0.13}$]O$_2$, which is a solid solution between [Li$_{1/3}$Mn$_{2/3}$]O$_2$ and Li[Mn$_{1/3}$Ni$_{1/3}$CO$_{1/3}$]O$_2$, with a surface modified by Al$_2$O$_3$, exhibits a specific capacity of 285 mAh/g, with excellent cyclability and an irreversible capacity of approximately 40 mAh/g. In this case, even if the irreversible capacity is reduced, it is not completely eliminated.

J. Gao et al., in the paper "High capacity Li[Li$_{0.20}$Mn$_{0.54}$Ni$_{0.13}$Co$_{0.13}$]O$_2$—V$_2$O$_5$, composite cathodes with low irreversible capacity loss for lithium ion batteries" (Electrochemistry Communications, 11 (2009), 84-86), propose to suppress the irreversible capacity by mixing the layered oxide Li[Li$_{0.20}$Mn$_{0.54}$Ni$_{0.13}$Co$_{0.13}$]O$_2$ with V$_2$O$_5$ used as insertion host for the free lithium. The positive electrode material is then obtained by grinding the layered oxide Li[Li$_{0.20}$Mn$_{0.54}$Ni$_{0.13}$Co$_{0.13}$]O$_2$ with a predetermined amount of NH$_4$VO$_3$ and by heating the mixture in air at 300° C. for 4 hours, in order to obtain the V$_2$O$_5$ phase. On studying different V$_2$O$_5$ contents, the authors found that the composite materials for a positive electrode Li[Li$_{0.20}$Mn$_{0.54}$Ni$_{0.13}$Co$_{0.13}$]O$_2$—V$_2$O$_5$ comprising between 10% and 12% by weight of V$_2$O$_5$ have a discharge capacity of approximately 300 mAh/g with a very low irreversible capacity loss and a good cyclability.

Furthermore, there exist other series of high-capacity layered oxides. They are lithium-enriched layered oxides of the Li$_{1+x}$Me$_{1-x}$O$_2$ type, where Me is one or more elements chosen from transition metals and 0<x<⅓. As indicated in patent application EP 1 903 627, lithium-enriched layered oxides of this type can also be formulated in the composite oxide form: xLi$_2$Mo$_3$·(1−x)LiMeO$_2$, with 0<x<1. In order to reduce the irreversible capacity of the cathode materials of Li$_{1+x}$Me$_{1-x}$O$_2$ type with x=0.2 or more, provision is made, in patent application EP 1 903 627, to combine, by simple addition, these lithium-enriched oxides with an oxide of a transition metal, such as V$_2$O$_5$ or VO$_x$ with 2<x<2.5.

OBJECT OF THE INVENTION

The object of the invention is to provide a novel positive electrode material for a lithium battery which makes it possible to obtain a high specific capacity, with a zero or virtually zero irreversible capacity in the first cycle without loss of cyclability. Such characteristics are advantageously obtained for normal cycling temperatures (between 20° C. and 55° C.) and in the range of potentials of the order of 2V to 4.8V vs. Li$^+$/Li.

According to the invention, this aim is achieved by a two-phase positive electrode material for a lithium battery consisting of:

- particles of lithium-enriched layered oxide of Li$_{1+x}$(Mn$_a$Ni$_b$M$_c$)$_{1-x}$O$_2$ type,
- and a metal oxide of Li$_y$VO$_z$ type, covering at least a portion of the surface of the particles of lithium-enriched layered oxide, where:
- 0.1<x<0.25,
- a+b+c=1, with a, b and c non-zero,
- M is a metal chosen from the group consisting of Mg, Zn, Al, Na, Ca and K,
- 0<y<3
- and 2.5<z<4.

Preferably, the metal oxide of Li$_y$VO$_z$ type completely covers the surface of the particles of lithium-enriched layered oxide.

Furthermore, according to a development of the invention, the two-phase positive electrode material for a lithium battery is composed of a core, formed of a lithium-enriched layered oxide of Li$_{1+x}$(Mn$_a$Ni$_b$M$_c$)$_{1-x}$O$_2$ type, and of a coating, formed around said core, of metal oxide of Li$_y$VO$_z$ type.

According to the invention, this aim is also achieved by a process for the synthesis of such a two-phase positive electrode material for a lithium battery, the synthesis of the positive electrode material comprising a stage of mixing, in aqueous solution, the presynthesized layered oxide with at least one precursor of the metal oxide, followed by a stage of heat-treatment at a temperature of greater than or equal to 280° C.

BRIEF DESCRIPTION OF THE DRAWINGS

Other advantages and characteristics will emerge more clearly from the description which will follow of specific embodiments of the invention, given as nonlimiting examples and represented in the appended drawings, in which.

DESCRIPTION OF SPECIFIC EMBODIMENTS

Figure 1:
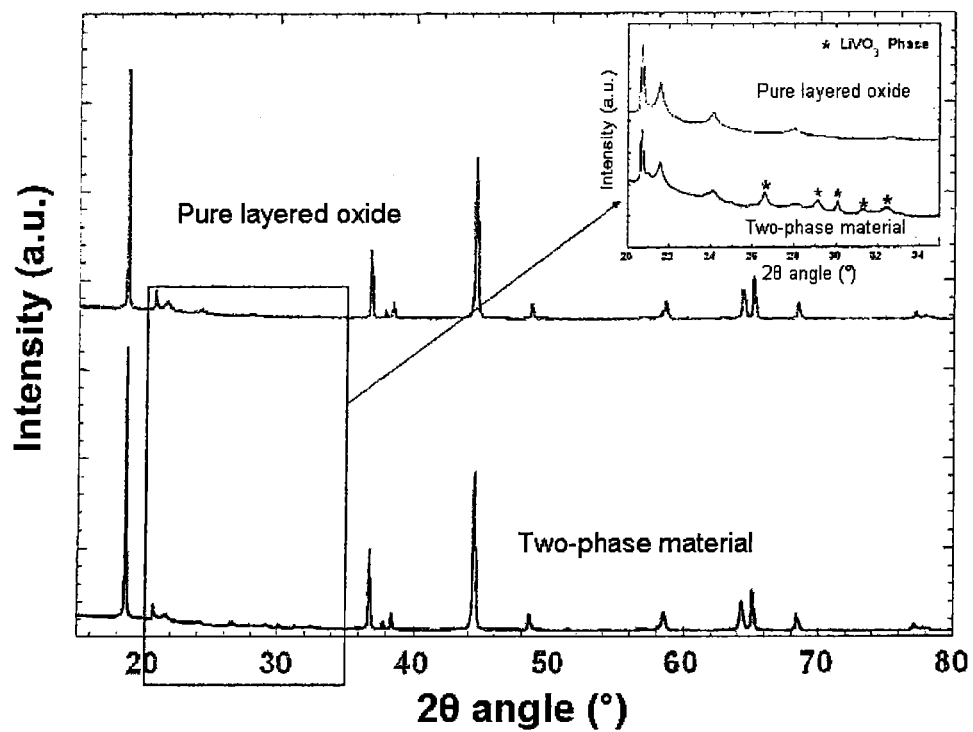
FIG. 1 represents an X-ray diffraction diagram (XRD) of the two-phase material $Li_{1.2}(Mn_{0.7625}Ni_{0.225}Mg_{0.0125})_{0.8}O_2/LiVO_3$ obtained according to a process of synthesis according to the invention and of the oxide $Li_{1.2}(Mn_{0.7625}Ni_{0.225}Mg_{0.0125})_{0.8}O_2$ alone, with, as an insert, a magnification of a portion of this diffractogram.

A novel positive electrode material for a lithium battery obtained, preferably, by a novel process of synthesis is provided in order to obtain a high specific capacity, with a zero or virtually zero irreversible capacity in the first cycle and without loss of cyclability. Such characteristics are advantageously obtained for normal cycling temperatures (between 20° C. and 55° C.) and within the range of potentials of the order of 2V to 4.8V vs. $Li^+/Li$.

This positive electrode material for a lithium battery is more particularly a two-phase material exhibiting a specific structure.

The first phase of the two-phase material is composed of particles of lithium-enriched layered oxide corresponding to the specific formula:

$$Li_{1+x}(Mn_aNi_bM_c)_{1-x}O_2$$

with:
 $0.1 \leq x \leq 0.25$,
 a+b+c=1, with a, b and c non-zero,

M is a metal chosen from the group consisting of Mg, Zn, Al, Na, Ca and K.

By way of example, the layered oxide can correspond to the formula $Li_{1.2}(Mn_{0.7625}Ni_{0.225}Mg_{0.0125})_{0.8}O_2$.

The second phase of the two-phase material is composed of a metal oxide corresponding to the following formula $Li_yVO_z$, with $0<y\leq3$ and $2.5<z<4$. The metal oxide is advantageously composed of $LiVO_3$. Furthermore, it is, preferably, at least partially in the crystalline form.

Furthermore, this second phase composed of a metal oxide corresponding to the formula $Li_yVO_z$ covers, at least partially and preferably completely, the surface of the particles of lithium-enriched layered oxide. Furthermore, the percentage by weight of metal oxide of $Li_yNO_z$ type is advantageously between 5% and 150 and preferably between 8% and 13%, with respect to the total weight of the two-phase material, the remainder consisting of the lithium-enriched layered oxide.

Such a two-phase material and more particularly the specific structure of said two-phase material, that is to say a pulverulent material consisting of particles of lithium-enriched layered oxide forming a core, the surface of which is at least partially and advantageously completely covered by the metal oxide have in particular been obtained using a process of synthesis employing a mixing by the aqueous route. In particular, the lithium-enriched layered oxide is mixed with at least one precursor of the metal oxide of $Li_yVO_z$ type placed in aqueous solution. The metal oxide of $Li_yNO_z$ type is then synthesized by heat-treatment at a temperature greater than or equal to 280° C. and advantageously between 300° C. and 600° C. The heat-treatment is advantageously carried out on a dry pulverulent product obtained after drying the mixture formed by the aqueous route.

The two-phase material obtained exhibits the following advantages:
 very homogeneous material,
 material having a high specific capacity as a result of the presence of the lithium-enriched layered oxide,
 material exhibiting a zero or virtually zero irreversible capacity in the first cycle, without loss of cyclability, as a result of the presence of the specific metal oxide $Li_yVO_z$ with $0<y\leq3$ and $2.5<z<4$.

Furthermore, the specific process of synthesis which makes it possible to obtain such a two-phase material is very easy to carry out and does not consume much energy, in contrast to the processes of the prior art which make use of mechanical mixtures of powders.

In the specific process of synthesis mentioned above, the precursor of the metal oxide of $Li_yVO_z$ type is advantageously chosen from $NH_4VO_3$ and $NaVO_3$.

Furthermore, before it is mixed with at least one precursor of the metal oxide of $Li_yVO_z$ type, the lithium-enriched layered oxide can be synthesized by carrying out a heat-treatment on a mixture comprising:
 manganese carbonate,
 nickel carbonate,
 a compound chosen from a carbonate, a sulfate and a nitrate and comprising the metal M,
 and a lithium source chosen from lithium carbonate and lithium hydroxide.

The heat-treatment made use of for the synthesis of the lithium-enriched layered oxide consists in heating said mixture up to a temperature of greater than or equal to 800° C. and advantageously of between 900° C. and 1100° C.

It is subsequently followed by a cooling, such as a quenching, for example in water or liquid nitrogen, or else such as a cooling in ambient air.

According to a specific embodiment, the two-phase material $Li_{1.2}(Mn_{0.7625}Ni_{0.225}Mg_{0.0125})_{0.8}O_2/LiVO_3$ was synthesized and then tested as positive electrode material for a lithium battery.

Firstly, the lithium-enriched layered oxide corresponding to the formula $Li_{1.2}(Mn_{0.7625}Ni_{0.225}Mg_{0.0125})_{0.8}O_2$ is synthesized by intimately mixing 13.70 g of $Li_2CO_3$, 21.06 g of $MnCO_3$, 6.69 g of $NiCO_3$ and 0.739 g of $MgSO_4$, by heating this mixture at 1000° C. for 24 h and by then very rapidly cooling it (for example by quenching).

Secondly, a portion of the lithium-enriched layered oxide thus synthesized is subsequently mixed with an aqueous solution of $NH_4VO_3$. In particular, this stage is carried out according to the following protocol:

2 grams of the layered oxide $Li_{1.2}(Mn_{0.7625}Ni_{0.225}Mg_{0.0125})_{0.8}O_2$ synthesized beforehand are suspended in 10 ml of a 0.25M aqueous $NH_4VO_3$ solution, obtained by dissolving 0.283 g of $NH_4VO_3$ in 10 ml of $H_2O$, at 80° C. for 4 hours, once suspending has been carried out, the solution is kept stirred at 80° C. for 24 hours in order to carry out drying by evaporation, the powder obtained is subsequently heat-treated at a temperature of 300° C., under air and for 4 hours, in order to obtain a pulverulent compound.

The pulverulent compound obtained and the pure layered oxide $Li_{1.2}(Mn_{0.7625}Ni_{0.225}Mg_{0.0125})_{0.8}O_2$ synthesized beforehand (hereinafter referred to as pure layered oxide) were each characterized by X-ray diffraction (FIG. 1).

Thus, the X-ray diffraction spectrum of the pulverulent compound, in comparison with that of the pure layered oxide ($Li_{1.2}(Mn_{0.7625}Ni_{0.225}Mg_{0.0125})_{0.8}O_2$) shows not only that the $Li_{1.2}(Mn_{0.7625}Ni_{0.225}Mg_{0.0125})_{0.8}O_2$ phase is preserved but also the presence of an $LiVO_3$ crystalline phase. In particular, the analysis carried out by refinement according to the Rietveld method of the X-ray diffraction diagram (see magnification on FIG. 1 corresponding to the boxed part) makes it possible to determine a percentage by weight of $LiVO_3$ in the crystalline phase of 8.9%. This percentage by weight of $LiVO_3$ in the crystalline phase, compared with the theoretical percentage by weight expected for $LiVO_3$ of 13%, allows the existence to be assumed, on the one hand, of metal oxide of $Li_xVO_y$ type in the amorphous form with $0<y\leq3$ and $2.5<z<4$ and potentially of $LiVO_3$ in the amorphous form.

Figure 2:
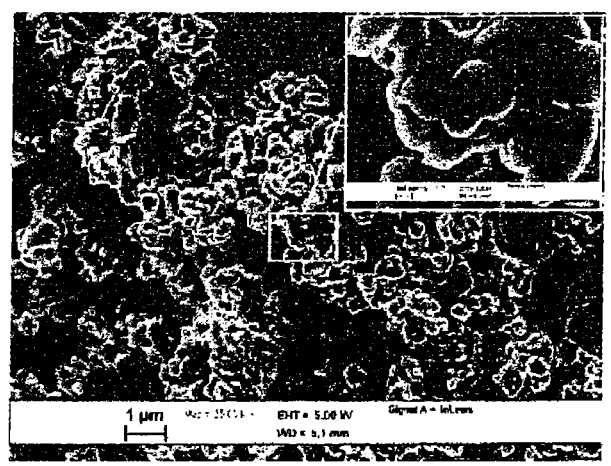
FIG. 2 corresponds to a scanning electron microscopy (SEM) image of the compound $Li_{1.2}(Mn_{0.7625}Ni_{0.225}Mg_{0.0125})_{0.8}O_2/LiVO_3$ obtained according to a process of synthesis according to the invention, magnified 25 000 times, with, as an insert, an SEM image of the same sample magnified 250 000 times.
Figure 3:
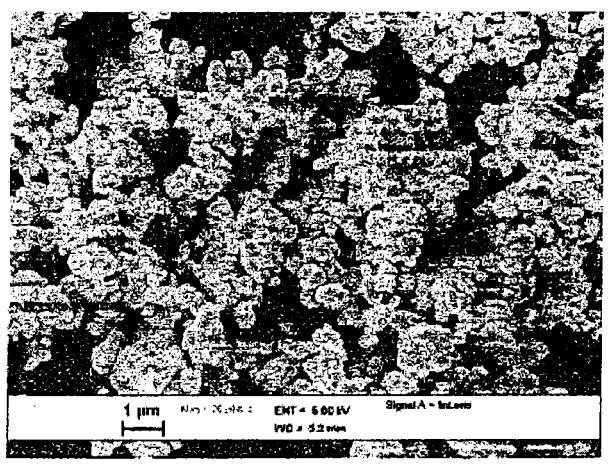
FIG. 3 corresponds to a scanning electron microscopy (SEM) image of the compound $Li_{1.2}(Mn_{0.7625}Ni_{0.225}Mg_{0.0125})_{0.8}O_2$ alone, magnified 25 000 times.

Furthermore, the two-phase material and the pure layered oxide were each observed by scanning electron microscopy (SEM). Thus, the photograph according to FIG. 2, representing the pulverulent compound obtained after mixing with $NH_4VO_3$ in aqueous solution and heat-treatment, shows particles with a mean size of the order of 300 nm which are weakly agglomerated. This morphology does not differ from that observed for the pure layered oxide (see FIG. 3). The process of synthesis used to form the pulverulent compound thus makes it possible to preserve the morphology of the pure layered oxide in the form of particles, while obtaining a very homogeneous composite material.

Figure 4:
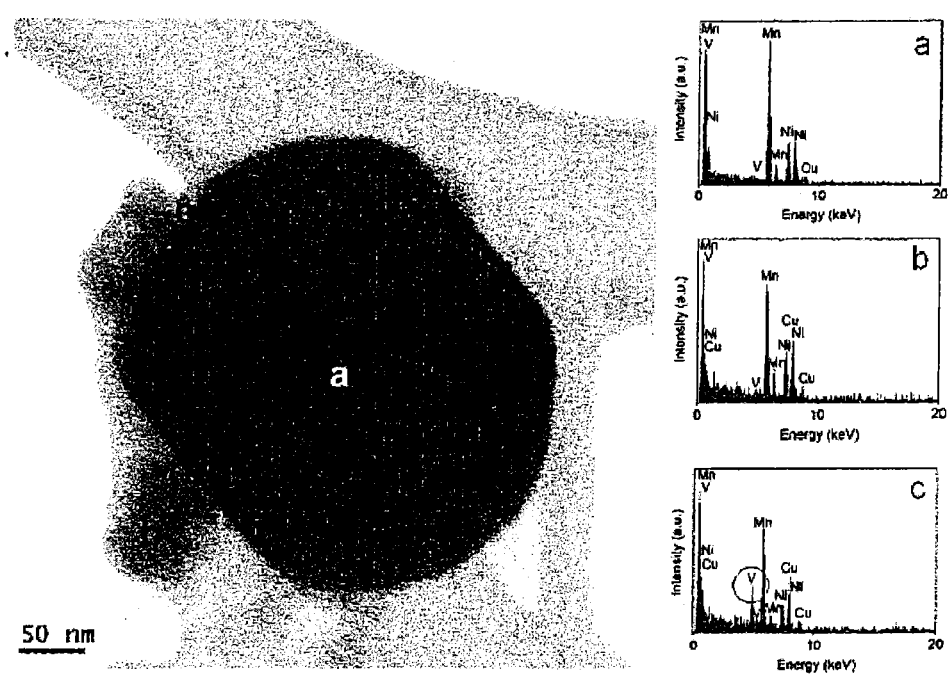
FIG. 4 corresponds to a transmission electron microscopy (TEM) image of the compound $Li_{1.2}(Mn_{0.7625}Ni_{0.225}Mg_{0.0125})_{0.8}O_2/LiVO_3$ synthesized, magnified 200 000 times, with, as an insert, three graphs a, b and c respectively corresponding to energy dispersive analysis (EDS) spectra collected at the points a, b and c of the image.

A characterization of the two-phase material by transmission electron microscopy (TEM) confirms the mean size observed by SEM (see FIG. 4). Moreover, an energy dispersive analysis (EDS) carried out at the center of the particles (points a and b in FIG. 4) and at the surface (point c in FIG. 4) demonstrates the presence of the $Li_yVO_z$ phase at the surface of the lithium-enriched layered oxide particles.

In particular, it is possible to estimate the thickness of the coating of the $Li_yVO_z$ phase at the surface of the particles of layered oxide at between 3 nm and 15 nm.

Once synthesized, the two-phase material $Li_{1.2}(Mn_{0.7625}Ni_{0.225}Mg_{0.0125})_{0.8}O_2/LiVO_3$ was tested as positive electrode material for a lithium battery. In particular, a first lithium battery of "button cell" type was produced with:

a negative lithium electrode with a diameter of 16 mm and a thickness of 135 μm, a positive electrode with a diameter of 14 mm comprising the composite material $Li_{1.2}(Mn_{0.7625}Ni_{0.225}Mg_{0.0125})_{0.8}O_2/LiVO_3$ (80% by weight), carbon black (10.% by weight) and polyvinylidene hexafluoride (10% by weight), everything being deposited on a current collector formed by a sheet of aluminum with a thickness of 20 μm, and a separator impregnated with a liquid electrolyte composed of a solution of $LiPF_6$ (1 mol·l$^{-1}$) in a mixture of ethylene carbonate and dimethyl carbonate.

A second lithium battery was produced by way of comparison with the same constituents as the first lithium battery, with the exception of the active material of the positive electrode. In this second lithium battery, the active material of the positive electrode is formed by pure layered oxide.

Figure 5:
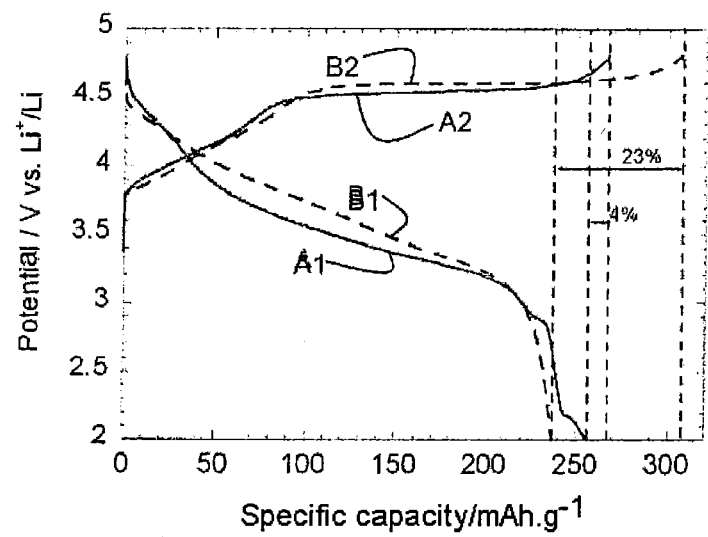
FIG. 5 represents the change in the potential as a function of the specific capacity of the first discharge and of the first charge in galvanostatic mode (conditions C/10, 25° C.) of two Li-metal batteries respectively comprising $Li_{1.2}(Mn_{0.7625}Ni_{0.225}Mg_{0.0125})_{0.8}O_2/LiVO_3$ (curves A1 and A2) and $Li_{1.2}(Mn_{0.7625}Ni_{0.225}Mg_{0.0125})_{0.8}O_2$ (curves B1 and B2) as positive electrode active materials.

In FIG. 5, the curves A1 and B2 show the change in the potential as a function of the specific capacity, during the first charge, for the first and second lithium batteries respectively and the curves A2 and B2 show the change in the potential as a function of the specific capacity, during the first discharge, for the first and second lithium batteries respectively. These curves show a very significant decrease in the irreversible capacity (change from 23% to 4%) in the first cycle, due to the addition of the $LiVO_3$ phase.

Figure 6:
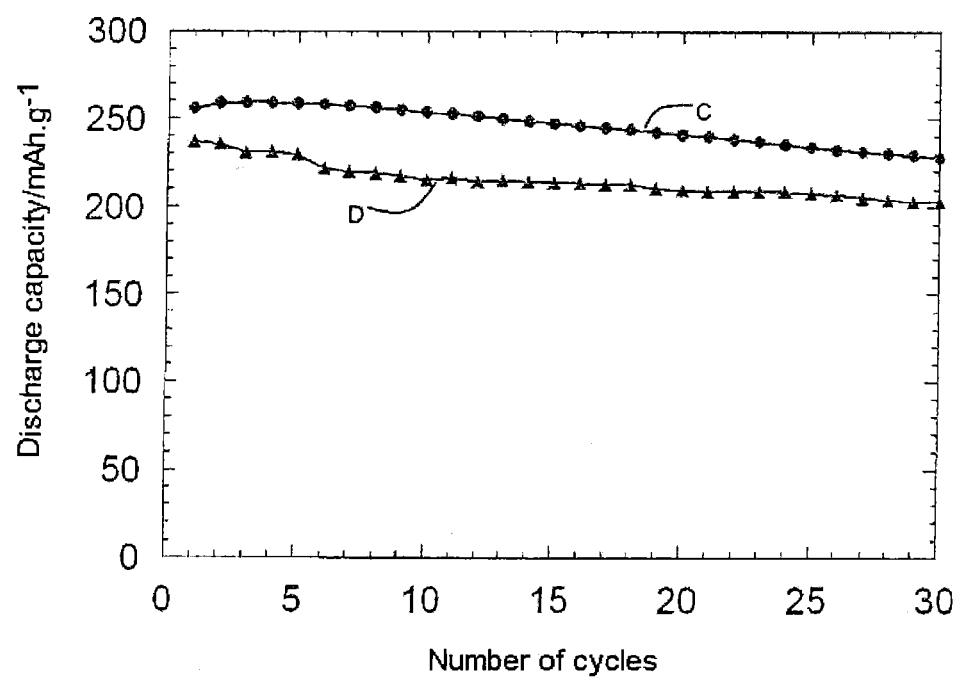
FIG. 6 represents the change in the specific capacity in discharge as a function of the number of cycles in galvanostatic mode (conditions C/10, 25° C.) of Li-metal batteries respectively comprising $Li_{1.2}(Mn_{0.7625}Ni_{0.225}Mg_{0.0125})_{0.8}O_2/LiVO_3$ (curve C) and $Li_{1.2}(Mn_{0.7625}Ni_{0.225}Mg_{0.0125})_{0.8}O_2$ (curve D) as positive electrode active materials.

Furthermore, in FIG. 6, the curves C and D represent the change in the specific capacity in discharge for the first and second batteries respectively, as a function of the number of cycles in galvanostatic mode (conditions C/10, 25° C.). These curves show that the two-phase material exhibits a very high specific capacity and also a very good cyclability.

The invention claimed is:

1. A two-phase positive electrode material for a lithium battery consisting of:
    particles of lithium-enriched layered oxide of formula $Li_{1+x}(Mn_aNi_bM_c)_{1-x}O_2$, and
    a metal oxide of formula $Li_yVO_z$, covering at least a portion of a surface of the particles of lithium-enriched layered oxide,
    wherein:
    $0.1\leq x\leq 0.25$,
    $a+b+c=1$, with a, b and c being non-zero,
    M is a metal selected from the group consisting of Mg, Zn, Al, Na, Ca and K,
    $0<y\leq3$, and
    $2.5<z<4$.

2. The material of claim 1, wherein the metal oxide is $LiVO_3$.

3. The material of claim 1, wherein the lithium-enriched layered oxide is $Li_{1.2}(Mn_{0.7625}Ni_{0.225}Mg_{0.0125})_{0.8}O_2$.

4. The material of claim 1, wherein a percentage by weight of the metal oxide is between 5% and 15%, with respect to a total weight of the material.

5. The material of claim 1, wherein the metal oxide is at least partially crystalline.

6. The material of claim 1, wherein the metal oxide forms a coating with a thickness of between 3 nm and 15 nm at the surface of the particles of lithium-enriched layered oxide.

7. A process for producing the material of claim 1, comprising:
    mixing the lithium-enriched layered oxide with at least one precursor of the metal oxide placed in an aqueous solution, thereby obtaining a mixture, and
    heat treating the mixture at a temperature of greater than or equal to 280° C., thereby obtaining the material.

8. The process of claim 7, wherein the at least one precursor of the metal oxide is selected from the group consisting of $NH_4VO_3$ and $NaVO_3$.

9. The process of claim 7, wherein the metal oxide is $LiVO_3$.

10. The process of claim 7, wherein the lithium-enriched layered oxide is obtained by a process comprising:
heat treating a pulverulent mixture comprising:
manganese carbonate,
nickel carbonate,
a compound comprising the metal M and selected from the group consisting of a carbonate, a sulfate and a nitrate, and
a lithium source selected from the group consisting of lithium carbonate and lithium hydroxide,
at a temperature of greater than or equal to 800° C., and
cooling the pulverulent mixture, thereby obtaining the lithium-enriched layered oxide.

11. The process of claim 10, wherein the cooling occurs by quenching or with ambient air.

12. The process of claim 7, wherein the lithium-enriched layered oxide is $Li_{1.2}(Mn_{0.7625}Ni_{0.225}Mg_{0.0125})_{0.8}O_2$.

13. A two-phase positive electrode material for a lithium battery comprising:
particles of lithium-enriched layered oxide of formula $Li_{1+x}(Mn_aNi_bM_c)_{1-x}O_2$, and
a metal oxide of formula $Li_yVO_z$, covering at least a portion of a surface of the particles of lithium-enriched layered oxide,
wherein:
$0.1 \leq x \leq 0.25$,
a+b+c=1, with a, b and c being non-zero,
M is a metal selected from the group consisting of Mg, Zn, Al, Na, Ca and K,
$0 < y \leq 3$, and
$2.5 < z < 4$.

14. A lithium battery, comprising the two-phase positive electrode material of claim 1.

15. A lithium battery, comprising the two-phase positive electrode material of claim 2.

16. A lithium battery, comprising the two-phase positive electrode material of claim 3.

17. A lithium battery, comprising the two-phase positive electrode material of claim 4.

18. A lithium battery, comprising the two-phase positive electrode material of claim 5.

19. A lithium battery, comprising the two-phase positive electrode material of claim 6.

20. A lithium battery, comprising the two-phase positive electrode material of claim 13.

* * * * *